US012328222B2

(12) United States Patent
Tsirkin et al.

(10) Patent No.: US 12,328,222 B2
(45) Date of Patent: Jun. 10, 2025

(54) REVERSE VIRTUAL ETHERNET PORT AGGREGATOR BRIDGING FOR SINGLE ROOT I/O VIRTUALIZATION

(71) Applicant: Red Hat, Inc., Raleigh, NC (US)

(72) Inventors: Michael Tsirkin, Westford, MA (US); Amnon Ilan, Katzir (IL)

(73) Assignee: Red Hat, Inc., Raleigh, NC (US)

( * ) Notice: Subject to any disclaimer, the term of this patent is extended or adjusted under 35 U.S.C. 154(b) by 358 days.

(21) Appl. No.: 17/704,807

(22) Filed: Mar. 25, 2022

(65) Prior Publication Data

US 2023/0308345 A1 Sep. 28, 2023

(51) Int. Cl.
*H04L 41/08* (2022.01)

(52) U.S. Cl.
CPC .................................. *H04L 41/08* (2013.01)

(58) Field of Classification Search
None
See application file for complete search history.

(56) References Cited

U.S. PATENT DOCUMENTS

| 8,265,075 | B2 | 9/2012 | Pandey |
| 8,514,890 | B2 | 8/2013 | Kidambi et al. |
| 8,930,690 | B2 | 1/2015 | Zuo et al. |
| 9,311,120 | B2 | 4/2016 | Elzu |
| 9,600,313 | B2 | 3/2017 | Nimmagadda et al. |
| 10,812,632 | B2 | 10/2020 | Shah et al. |
| 11,005,755 | B2 | 5/2021 | Yu et al. |
| 2012/0016970 | A1* | 1/2012 | Shah .................... G06F 15/177 709/220 |
| 2013/0152075 | A1* | 6/2013 | Cardona .................... G06F 9/54 718/1 |
| 2019/0042741 | A1* | 2/2019 | Abodunrin .......... G06F 13/4068 |
| 2019/0089640 | A1* | 3/2019 | To .......................... H04L 47/828 |
| 2020/0150997 | A1* | 5/2020 | Chang ................. G06F 9/45558 |
| 2022/0029934 | A1* | 1/2022 | Jiang ....................... H04L 45/74 |
| 2023/0208810 | A1* | 6/2023 | Dhanasekar ........ H04L 63/1416 726/26 |

OTHER PUBLICATIONS

Shah et al., "Virtual Networking Management White Paper", Distributed Management Task Force, Inc. (DMTF), published Nov. 8, 2011, pp. 1-58.
Smolyar et al., "Securing Self-Virtualizing Ethernet Devices", Proceedings of the 24th USENIX Security Symposium (2015), USENIX Association, pp. 335-350.

* cited by examiner

*Primary Examiner* — Adnan Baig
(74) *Attorney, Agent, or Firm* — Kilpatrick Townsend & Stockton LLP

(57) ABSTRACT

A system includes a physical host, a host operating system, and a virtual machine having a virtual network-interface controller. The virtual network-interface controller comprises an uplink, a virtual function, and a physical function having a physical channel and a virtual channel. The hypervisor is configured to receive data that originates at the virtual function, which is forwarded to the physical function on the physical channel of the physical function. The data is further forwarded from the physical function to the uplink. Additionally, the hypervisor is configured to send data that does not originate at the virtual function. The hypervisor sends the data on the virtual channel of the physical function and the physical function forwards the data to the virtual function.

17 Claims, 3 Drawing Sheets

REVERSE VIRTUAL ETHERNET PORT AGGREGATOR BRIDGING FOR SINGLE ROOT I/O VIRTUALIZATION

BACKGROUND

The present disclosure generally relates to communication systems involving virtual machines, which can be hosted on physical computer systems. To host virtual machines, a physical computer system may typically use a hypervisor. A hypervisor, or virtual machine monitor, is the computer software, firmware, or hardware that creates and runs the virtual machine. Nested virtualization further allows a physical computer system to host virtual machines within a first virtual machine. Thus, a first virtual machine can contain a second virtual machine, which can then contain a third virtual machine, and so forth.

SUMMARY

The present disclosure provides a new and innovative system, methods and apparatus for data communications involving virtual machines. In an example, a system includes a physical host, a host operating system, and a virtual machine having a virtual network-interface controller. The virtual network-interface controller comprises an uplink, a virtual function, and a physical function having a physical channel and a virtual channel. The hypervisor is configured to receive data. Namely, data that originates at the virtual function, which is forwarded to the physical function on the physical channel of the physical function. The data is further forwarded from the physical function to the uplink. Additionally, the hypervisor is configured to send data that does not originate at the virtual function. The hypervisor sends the data on the virtual channel of the physical function and the physical function forwards the data to the virtual function.

In an example, the hypervisor receives data. The data originates at the virtual function, which forwards the data to the physical function. The physical function then forwards the data to the uplink by, for example, sending the data on the physical channel of the physical function. Further, the pathway of the data from the virtual function to the physical function to the uplink is demonstrated in the example communication example. The virtual function cannot send the data directly the uplink; the virtual function must first send the data to the physical function. In another example, the hypervisor send data. The data does not originate at the virtual function. The physical function can forward the data to the virtual function. Additionally, the hypervisor is configured to send data on the physical channel of the physical function from the physical function to the uplink.

In another example, a method includes receiving, by a hypervisor, data originating at the virtual function and forwarded to the physical function, which forwards the data on the physical channel to the uplink. The data may be filtered prior to the data being forwarded from the physical function. Additionally, the hypervisor sends data not originating at the virtual function on a virtual channel of the physical function, which forwards the data to the virtual function. In many embodiments, the uplink cannot send data directly to the virtual function. Similarly, the virtual function cannot send data directly to the uplink. The data may be required to interact with the physical function in between the virtual function and the uplink.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
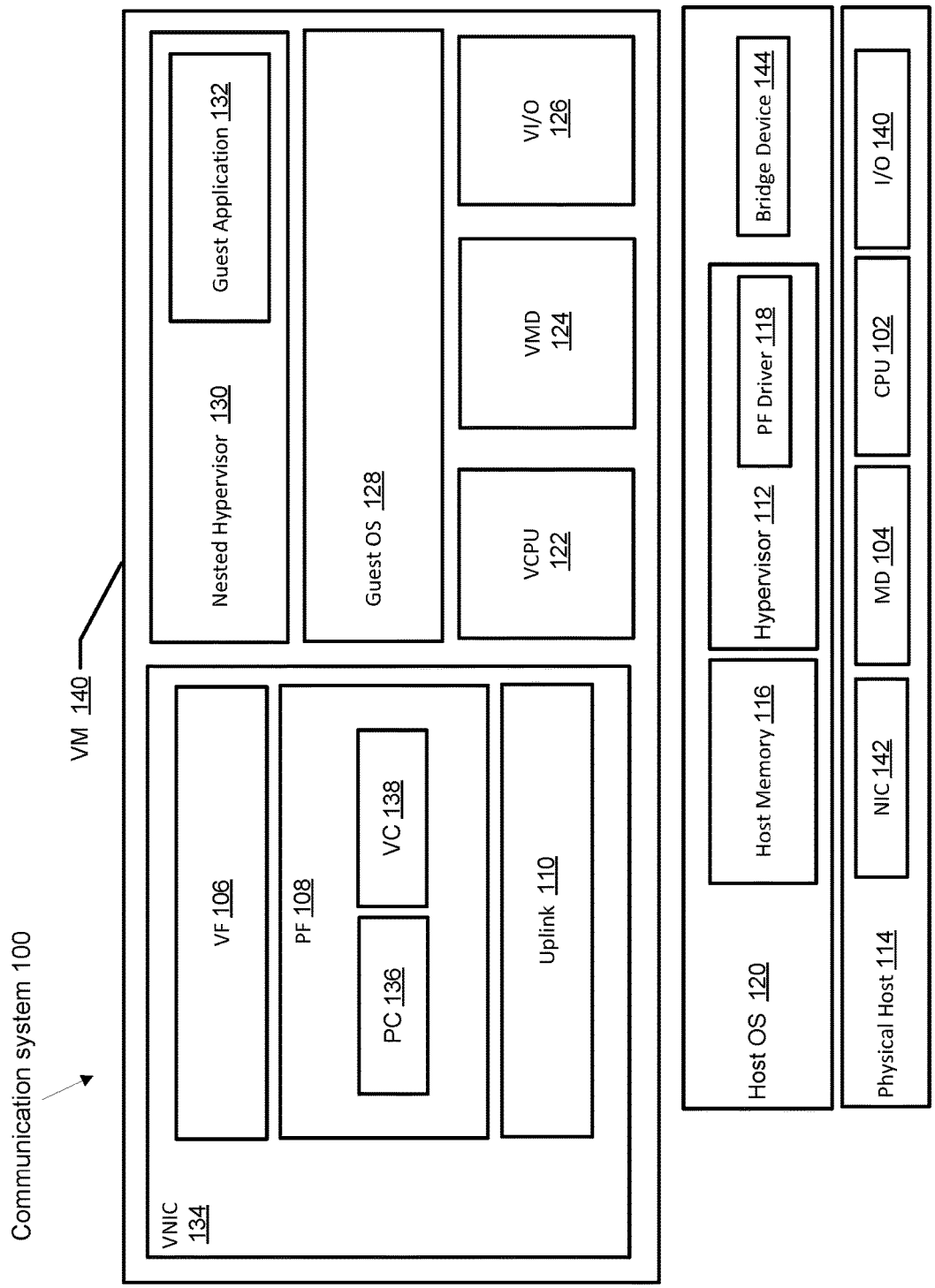
FIG. 1 is a block diagram of a communication system, according to various examples of the present disclosure.

Systems and methods are disclosed for reverse virtual ethernet port aggregator bridging for virtual devices when transmitting or receiving data. Virtualization allows a host machine to run multiple virtual environments, for example using a hypervisor (e.g., Kernel-based Virtual Machine ("KVM")) on an operating system, such as Red Hat® Enterprise Linux® ("RHEL"). These virtual environments, such as a hypervisor, are further used to create and run virtual machines. And virtual machines, just as physical computer systems, routinely send and receive data during virtualization. When receiving and transmitting data, hypervisor vendors and operating system vendors often attempt to improve networking speed and efficiency, which can be manipulated in several ways. For example, virtual machines can use the network-interface controller on the host machine to send and receive data. Or, virtual machines can use virtual network-interface controllers in this process. Also, whether or not the virtual machine must exit to the hypervisor to send or receive data can affect the communication process.

Device pass-through processes are one type of processes that are used with virtual machines for communication, which gives a virtual machine direct access to a network-interface controller. In pass-through processes, the network-interface controller includes a virtual function, a physical function, and an uplink. Peripheral component interconnect pass-through is one pass-through process that allows a virtual machine to send and receive data on a host device. Under the peripheral component interconnect pass-through process, a virtual machine has direct access to a peripheral component interconnect devices on the host device. Thus, for example, a virtual machine can use the pass-through process for direct access to the network-interface controller of the host device. Direct access with the network-interface controller allows the guest operating system, which runs on the virtual machine, to communicate with the network-interface controller of the host device without the participation of the hypervisor. The network-interface controller of the host device is then used to receive and communicate information.

Virtual machines can also use Single Root I/O Virtualization as a pass-through process to access the network-interface controller of the host device. However, rather than granting the virtual machine exclusive control over the network-interface controller, Single Root I/O Virtualization allows the network-interface controller to be shared. In an example, Single Root I/O Virtualization can partition the network-interface controller and grant more than one virtual machines concurrent access to the network-interface controller, which may be advantageous if the host device contains multiple virtual machines. Access can also be shared between a virtual machine and the hypervisor itself. Further, Single Root I/O Virtualization maintains direct access to the network-interface controller like the peripheral component interconnect pass-through process. Thus, by using Single Root I/O Virtualization, multiple virtual machines can share direct access to a network-interface controller for transmitting and receiving data without exiting to the hypervisor. For the communication configuration, the Standard Single Root I/O Virtualization uses an "all-to-all" communication for the virtual function, the physical function, and the uplink. For example, through an internal switch, the uplink can communicate with the virtual function. Similarly, the uplink can communicate with the physical function. Thus, the uplink is not restricted in communicating with only the virtual function or only the physical function. This may typically provide added benefit for more efficient communication.

Although the peripheral component interconnect pass-through process and Single Root I/O Virtualization allows virtual machines direct access to a network-interface controller of the host device, there are significant disadvantages to these processes. Namely, through bypassing the hypervisor, the hypervisor cannot filter data going to and from the virtual machine. Although a virtual network-interface controller may be used if filtering is desired, a virtual network-interface controller requires an exit from the virtual machine to notify the hypervisor about the presence of data, which offsets the intended advantage of the pass-through processes capability of not requiring an exit. Further processes, such as virtual ethernet port aggregator bridging also have undesirable consequences. For example, in virtual ethernet port aggregator bridging, all virtual functions send data on the uplink. As such, the virtual functions are required to send data on the uplink even if the communication is from virtual function to virtual function or virtual function to physical function. The rigid communication connections of virtual ethernet port aggregator bridging cause undesirable effects.

A proposed solution to the above described disadvantages is to reconfigure the virtual machine communications. Namely, the proposed solution allows the hypervisor to flexibly filter data going to and from the virtual machine, which is one disadvantage of the peripheral component interconnect pass-through process and Standard Single Root I/O Virtualization. Further, the proposed solution provides a more flexible communication protocol. Namely, the proposed configuration does not require data to be sent to the physical link. In an example, data that is sent from the virtual function to virtual function or data that is sent from the virtual function to the physical function is not required to be sent to physical link. In contrast, virtual ethernet port aggregator bridging required the data to be sent to the physical link. This rigid communication protocol was one disadvantage of virtual ethernet port aggregator bridging.

As described in the various example embodiments disclosed herein, to maintain performance and allow the hypervisor to filter data going to and from the virtual machine, the hypervisor is configured to communicate with the virtual machine. Namely, when sending data, the virtual function receives the data without an exit, and the data is received by a bridge device of the host. Once received by the bridge device, the data can be filtered and forwarded to the uplink for transmission. Thus, unlike the pass-through processes described above, the proposed configuration of the reverse virtual ethernet port aggregator mode can filter data without a virtual machine exit. Further, unlike the rigid communication of the virtual ethernet port aggregator bridging, the proposed configuration of the reverse virtual ethernet port aggregator mode can communicate between the virtual function and the physical function. The virtual function is not required to send data on the physical link. For example, with virtual function to physical function communication, a virtual function can forward data on a physical channel directly to the physical function. Inversely, the physical function can forward data to the virtual function. Thus, the proposed configuration of the reverse virtual ethernet port aggregator mode does not require all data to be sent on the physical link.

FIG. 1 depicts a block diagram of an example communication system in accordance with one or more aspects of the present disclosure. The communication system 100 may include a physical host 114, a host operating system 120, and a virtual machine 240. The physical host 114 may include a network-interface controller 142 having a CPU 102, a memory device 104, and an input/output device 140.

As discussed herein, memory device 104 refers to volatile or non-volatile memory devices, such as RAM, ROM, EEPROM, or any other device capable of storing data. In an example, memory device 104 may be persistent storage devices such as hard drive disks ("HDD"), solid state drives ("SSD"), and/or persistent memory (e.g., Non-Volatile Dual In-line Memory Module ("NVDIMM")). Memory device 104 may additionally include replication of data to prevent against data loss due to a failure in any one device. This replication may be implemented through, for example, a redundant array of independent disks ("RAID") setup. RAID arrays may be designed to increase performance, to provide live data backup, or a combination of both.

As discussed herein, input/output device 140 refers to devices capable of providing an interface between one or more processor pins and an external device, the operation of which is based on the processor inputting and/or outputting binary data. CPU 102 may be interconnected using a variety of techniques, ranging from a point-to-point processor interconnect, to a system area network, such as an Ethernet-based network. Local connections within physical host 120, including the connections between processor 102 and memory device 104 and between processors 102 and input/output device 140 may be provided by one or more local buses of suitable architecture, for example, peripheral component interconnect.

As used herein, physical processor or processors 102 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

The physical host 214 may host the virtual machine 140. Virtual machine 140 may include a guest operating system 128, a virtual CPU 122, a virtual memory device 124, a virtual input/output device 126, a nested hypervisor 130, and a virtual network-interface controller 134. The virtual machine 140 may host additional nested layers of guests with the nested hypervisor 130 having a guest application 132. In an example, virtual machine 140 may host other guests necessary to execute their configured roles (e.g., a nested hypervisor or nested containers). For example, virtual machine 140 may further host a Java® Virtual Machine ("JVM") if execution of Java® code is necessary.

In an example, a virtual machine 140 may execute a guest operating system 128 and run applications, which may use the underlying virtual CPU 122, virtual memory device 124, and virtual input/output device 126. One or more applications may be running on a virtual machine 140 under the respective guest operating system 128. A virtual machine may run on any type of dependent, independent, compatible, and/or incompatible applications on the underlying hardware and operating system. In an example, applications that run on a virtual machine 140 may be dependent on the underlying hardware and/or host operating system 120. In another example, applications that run on a virtual machine 140 may be independent of the underlying hardware and/or host operating system 120.

The virtual network-interface controller 134 of the virtual machine 140 comprises an uplink 110, a virtual function 106, and a physical function 108 having a physical channel 136 and a virtual channel 138. A physical function may include only one channel. However, the physical function may be required to include at least two channels, a physical channel and a virtual channel for a communication system configuration. For example, physical function 208 includes the physical channel 136 and the virtual channel 138, which may transmit data. The physical channel 136 and the virtual channel 138 may not receive data in the example illustration of FIG. 1.

The host operating system 120 of the communication system 100 may include a host memory 116, a bridge 144, and a hypervisor 112 having a physical function driver 118. The hypervisor 112 may manage host memory 116 for the host operating system 120 as well as memory allocated to the virtual machine 140. The physical function driver 118 of the host memory 116 passes information from the network-interface controller 142 to the host operating system 120. Further, at the level of the host operating system 120, the physical function driver 118 exposes two network devices to the host operating system 120. Namely, the physical function driver 118 exposes the bridge device 144 and the uplink 110 to the host operating system 120. In an example, the bridge device 144 is connected to the virtual function 106 through the virtual channel 138. In another example, an external uplink is connected to the uplink 110 through the physical channel 136. The bridge device 144 and the external uplink may share the media access control address of the physical function 108. Further, the host operating system 120 may link or route data communication between the bridge device 144 and the external uplink. The operating system 120 may also install, for example, filters or firewalls between the bridge device 144 and the external uplink.

Figure 2:
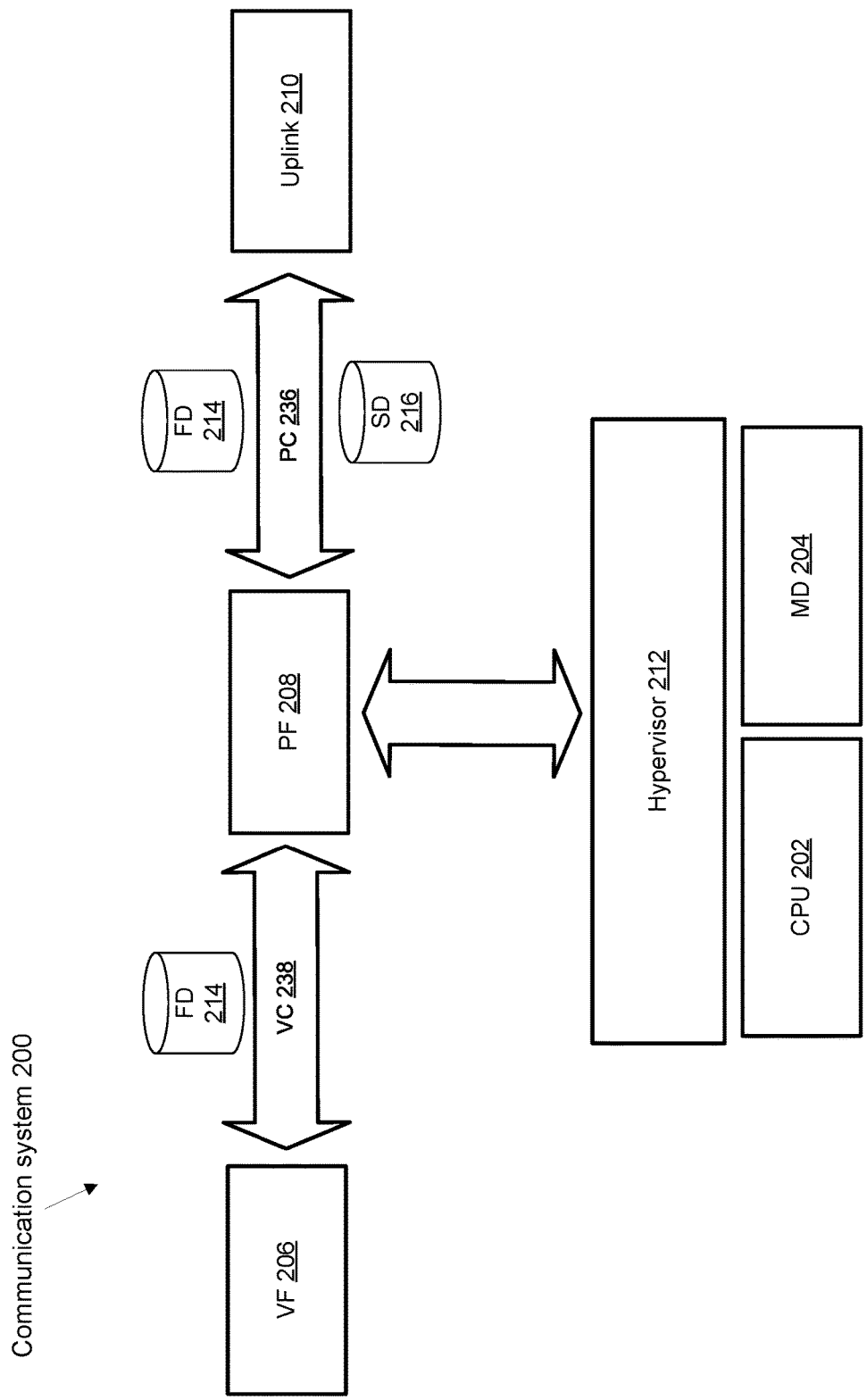
FIG. 2 is a block diagram of a communication system, according to various examples of the present disclosure.

FIG. 2 is a block diagram of a communication system, according to various examples of the present disclosure. The communication system 200 communicates data. In an example, a communication system 200 includes a hypervisor 112, a CPU 202, and a memory device 204. The communication system 200 further includes an uplink 210, a virtual function 206, and a physical function 208 having a physical channel 236 and a virtual channel 238. The example communication system 200 may communicate a first data 214 and a second data 216.

In many embodiments, the virtual function 206 can forward the first data 214 to the physical function 208. In an example, the first data 214 originates at the virtual function 206. The first data 214 can originate at the virtual function 206 in several ways, including, for example the first data 214 coming from the virtual machine 240. Additionally, the first data 214 could come from a guest application, which is then forwarded by the virtual machine 240 to originate at the virtual function 206. The virtual function 206 can forward the first data 214 to the physical function 208. FIG. 2 illustrates an example embodiment where the first data 214 originates at the virtual function 206. The virtual function 206 then forwards the first data 214 to the physical function 208 on the virtual channel 238 of the physical function 208. Additionally, the virtual function 206 can interact with data that does not originate at the virtual function 206. In an example, the second data 216 does not originate at the virtual function 206. The second data 216 could originate at the physical function 208. When the second data 216 does not originate at the virtual function 206, the virtual function 206 can receive the second data 216 from the virtual channel 238 of the physical function. In several embodiments, the virtual function 206 is incapable of forwarding the first data 214 directly to the uplink 210. The virtual function 206 must forward the first data 214 to the physical function 208, which then can forward the first data 214 to the uplink 210. Further, the virtual function 206 cannot forward the first data 214 on the physical channel 236 of the physical function 208. The virtual function 206 must forward the first data 214 to the physical function 208 on the virtual channel 238 of the physical function 208.

In various embodiments, the physical function 208 can receive the first data 214 forwarded from the virtual function 206 on the virtual channel 238. Further, as shown in FIG. 1, the physical function 208 can also forward the first data 214 received from the virtual function 206 on the virtual channel 238 to the uplink 210. In an example, the physical function 208 can receive the first data 214 and then forward the first data 214 to the uplink 210 on the physical channel 236. Additionally, the physical function 208 can forward the second data 216 to the uplink 210. If the second data 216 does not originate at the virtual function 206, the physical function 208 can forward the second data 216 to the virtual function 206. In another example, data can originate at the physical function 208. Data originating at the physical function 208 can be forwarded by the physical function 208 to the virtual function 206 by sending the data on, for example, the virtual channel 238.

In a number of embodiments, the uplink 210 can receive data. In an example, the uplink 210 can receive the first data 214 originating at the virtual function 206. The first data 206 originating at the virtual function 206 is forwarded to the physical function 208, which forwards the first data 214 to the uplink 210. In several embodiments, the uplink 210 cannot receive the first data 214 directly from the virtual function 206. The virtual function 206 must forward the first data 214 to the physical function 208. The uplink 210 then can receive the first data 214 from the physical function 208. Similarly, the uplink 210 is incapable of forwarding the second data 216 directly to the virtual function 206. The uplink 210 must forward the second data 216 to the physical function 208. In an example, incoming data from the uplink 210 may be forwarded as the second data 216 to the physical function 208. When the uplink 210 forwards the second data 216 to the physical function 208, the uplink 210 is not required to use a specific channel of the physical function 208. FIG. 2 is an example illustration where the uplink 210 uses the physical channel 236 to forward the second data 216 to the physical function 208. The physical function 208 can then forward the second data 216 to the virtual function 206. Thus, FIG. 2, as an example illustration, demonstrates that the uplink 210 and the virtual function 206 cannot directly send and receive data to each other without the physical function 208.

In various embodiments, the hypervisor 212 is configured to receive the first data 214 on a virtual channel 238. In an example, the first data 214 can originate at the virtual function 206. The first data 214 can then be received by the hypervisor 212 on a virtual channel 238. The hypervisor 212 is further configured to send the second data 216 not originating at the virtual function 206. In another example, the second data 216 does not originate at the virtual function 206. The hypervisor 212 is configured to send the second data 216 to the physical function 208, which is configured to forward the second data 216 to the virtual function 206. In many embodiments, the hypervisor 212 is configured to receive a third data. For example, the hypervisor 212 is configured to receive the third data from the uplink 210. Specifically, the hypervisor 212 receives the third data forwarded from the uplink 210 to the physical function 208. In an example, the hypervisor 212 receives the third data that is forwarded from the uplink 210 to the physical function 208 on the physical channel 236. In another example, the hypervisor 212 is configured to forward the third data from the physical function 108 to the virtual function 106 by sending the third data on the virtual channel 138. Further, the hypervisor 212 is configured to forward a fourth data from the physical function 208 to the virtual function 206. In an example, the fourth data may be forwarded, by the hypervisor 212, from the physical function 208 to the virtual 206 on the virtual channel 238 of the physical function 208.

FIG. 2 illustrates a communication system 200 that communicates data, including data that originates at a virtual function and data that does not originate at the virtual function. For example, the first data 214 originates at the virtual function 206. The hypervisor 212 is configured to receive the first data 214 that originates at the virtual function 206. The hypervisor 212 is further configured to forward the first data 214 from the virtual function 206 to the physical function 208. Namely, the virtual function 206 sends the first data 214 to the physical function 208. In many embodiments, the first data 214 can be sent from the virtual function 206 to the physical function 208 on the virtual channel 238. The physical function 208 can then forward the first data 214 received from the virtual function 206 to the uplink 210. In another example, the second data 216 does not originate at the virtual function 206. The second data 216 could originate at the physical function 208. When the second data 216 does not originate at the virtual function 206, the hypervisor 212 is configured to send the second data 216. Namely, the physical function 208 is configured to forward the second data 216 to the virtual function 206. FIG. 2 demonstrates that the first data 214 and the second data 216 may interact with the virtual function 206 of the communication system 200 regardless of the origination location.

The configuration of the communication system 200 may allow the hypervisor 212 to filter data, for example, the first data 214 and the second data 216. If the virtual machine 140 transmits data, the data is received by the virtual function 206 without the virtual machine 140 exiting to the hypervisor 212. For example, if the virtual machine 140 intends to transmit the first data 214, the first data 214 is received by the virtual function 206 without the virtual machine 140 exiting to the hypervisor 212. The first data 214 is then received by the bridge device 144 on the host operating system 120 where the first data 214 can be filtered and forwarded to the external uplink for transmission. Further, as noted above, data may interact with the virtual function 206 regardless of its origination location. For example, data that is being sent to the uplink 210 is sent from the virtual function 206 to the physical function 208. Thus, for virtual devices, the data can be filtered within software without the virtual machine 140 exiting to the hypervisor 212. Further, the physical link/load switch may be lower for improved performance. FIG. 1 also demonstrates that the example communication system 100 may allow the virtual function 106 to communicate with the physical function 108. Thus, data can be filtered within software using the presently disclosed advantageous example configurations.

In many embodiments, the configuration of the communication system 100 may be applied to virtual components, including a virtual network-interface controller within a nested virtual machine. For an illustrative example, a system includes three levels, comprising L0, L1, and L2. Level L0 consists of a hypervisor and a network-interface controller. The hypervisor on level L0 hosts a virtual machine having a virtual network-interface controller. Level L1 consists of a guest hypervisor. Level L2 consists of a guest application of a guest operating system. Within the multilayer system, the steps completed by the virtual network-interface controller on L0 are completed by hypervisor on level L0. Further, the guest hypervisor on level L1 passes a virtual function to L2, the guest application or guest operating system. The multilayer system data may be forwarded from level L2 to level L0 to level L1 to level L0, in contrast to a typical L2 to L1 to L0 data forwarding process.

In several embodiments, the communication system may further include a virtual network-interface controller 134 comprising the virtual function 106, the physical function 108, and the uplink 110. The virtual network-interface controller 134 may be configured to transmit data. For example, the virtual network-interface controller 134 may be configured to transmit the first data 114 to the virtual channel 138 from the virtual function 106. The virtual network-interface controller 134 may be further configured to transmit the first data 114 to the uplink 110 from the physical channel 136 of the physical function 108. In various embodiments, the virtual network-interface controller 134 may be configured to transmit the second data 116 from the physical channel 136 of the physical function 108 to the uplink 110. In many embodiments, the virtual network-interface controller 134 may be configured to receive the third data. For example, the virtual network-interface controller 134 may be configured to receive the third data forwarded from the uplink 110 to the physical function 108. Further, the virtual network-interface controller 134 may be configured to forward the fourth data from the physical function 108 to the virtual function 106. The virtual network-interface controller 134 is an illustrative example, and, as such, the virtual network-interface controller 134 is not required to be a virtual or physical network-interface controller at a specific level.

Figure 3:
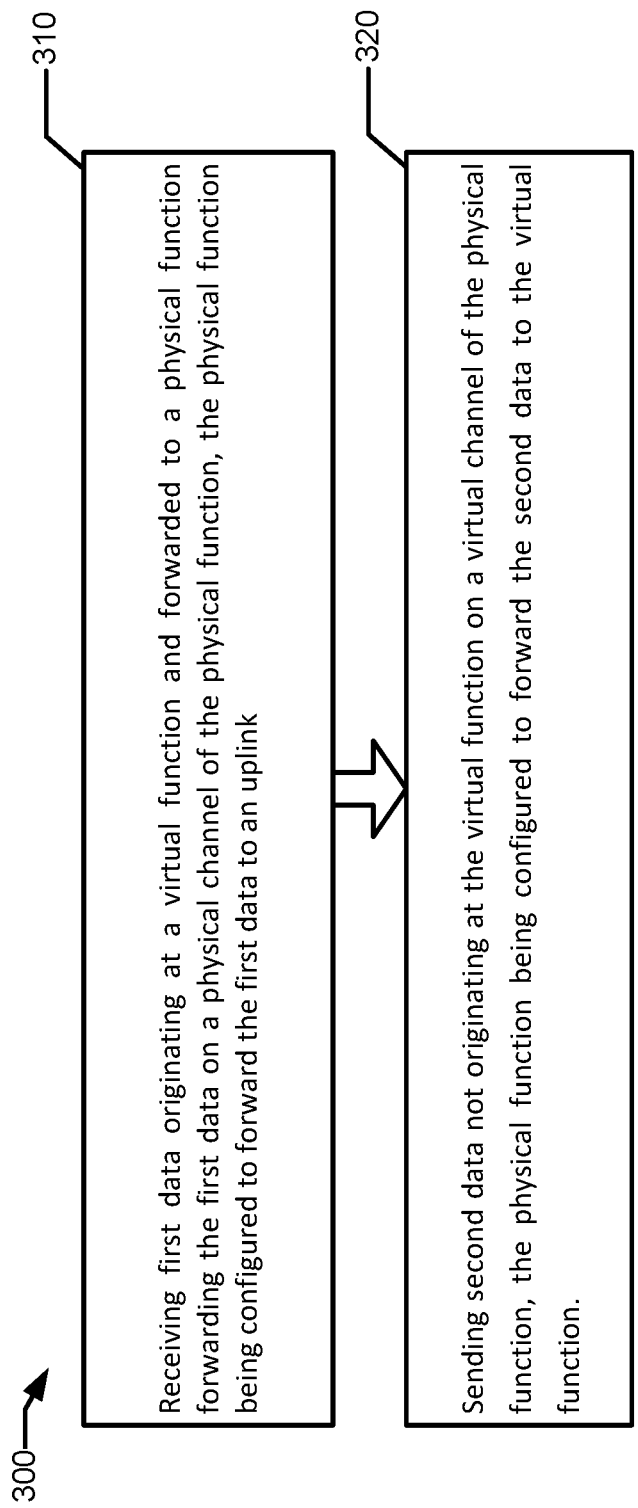
FIG. 3 is flowchart illustrating an example process for data communication, according to an example of the present disclosure.

FIG. 3 is flowchart illustrating an example process for data communication, according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes receiving first data originating at a virtual function and forwarded to a physical function forwarding the first data on a physical channel of the physical function, the physical function being configured to forward the first data to an uplink (block 310). For example, the hypervisor 212 may receive the first data 214. In an example, the hypervisor 212 may receive the first data 214 originating at the virtual function 206. The first data 214 that is received by the hypervisor 212 may be forwarded from the origination location, the virtual function 206, to the physical function 208. The first data 214 that is received by the hypervisor 212 may also be forwarded from the physical function 208 to the uplink 210. The physical function 208 may forward the first data 214 to the uplink 210 on the physical channel 236 of the physical function 208. In another example, the hypervisor 212 may receive the first data 214 that originates at the virtual function 206 on the virtual channel 238. Although not shown in FIG. 3, the hypervisor 212 may also receive data forwarded from the uplink to the physical function. For example, the hypervisor 212 may receive third data forwarded from the uplink 210 to the physical function 208. In another example, the hypervisor 212 may receive third data forwarded from the uplink 210 to the physical function 208 on the physical channel 236 of the physical function 208.

The example method 300 also includes sending second data not originating at the virtual function on a virtual channel of the physical function, the physical function being configured to forward the second data to the virtual function (block 320). For example, the hypervisor 212 may send the second data 216 not originating at the virtual function 206. In an example, the hypervisor 212 sends the second data 216 on the virtual channel 238 of the physical function 208. The second data 216 may be forwarded from the physical function 208 to the virtual function 206. In another example, the hypervisor 212 sends the second data 216 on the physical channel 236 of the physical function 208 from the physical function 208 to the uplink 210. Although not shown in FIG. 3, the hypervisor 212 may also forward data from the physical function to the virtual function. For example, the hypervisor 212 may forward fourth data from the physical function 208 to the virtual function 206. In another example, the hypervisor 212 may forward fourth data from the physical function 208 to the virtual function 206 by sending the fourth data on the virtual channel 238 of the physical function 208.

Block 310 and block 320 illustrate an example method 300 and many methods are appropriate. For example, the order of the block 310 and the block 320 may be switched. The first data can be received after the second data is sent. Further, the block 310 and the block 320 may be independent of each other. For example, block 310 may be executed and a hypervisor may receive data originating at the virtual function. When the hypervisor receives the first data originating at the virtual function, the hypervisor is not required to send the second data. Similarly, the hypervisor is not required to send the second data even when the second data is also received. Moreover, block 320 may be executed and a hypervisor may send data not originating at the virtual function. When the hypervisor sends the second data not originating at the virtual function, the hypervisor is not required to receive the first data.

Aspects of the subject matter described herein may be useful alone or in combination with one or more other aspects described herein. In a 1st exemplary aspect of the present disclosure, a system includes a processor in communication with a memory and a hypervisor. The hypervisor is configured to receive first data originating at a virtual function and forwarded to a physical function forwarding the first data on a physical channel of the physical function, the physical function being configured to forward the first data to an uplink; and send second data not originating at the virtual function on a virtual channel of the physical function, the physical function being configured to forward the second data to the virtual function.

In accordance with a 2nd exemplary aspect of the present disclosure, which may be used in combination with any one or more of the preceding aspects (e.g., the 1st aspect), the hypervisor is further configured to send second data on the physical channel of the physical function to the uplink.

In accordance with a 3rd exemplary aspect of the present disclosure, which may be used in combination with any one or more of the preceding aspects (e.g., the 1st aspect), the hypervisor is further configured to receive, on a virtual channel, the first data originating at a virtual function.

In accordance with a 4th exemplary aspect of the present disclosure, which may be used in combination with any one or more of the preceding aspects (e.g., the 1st aspect), the hypervisor is further configured to receive third data forwarded from the uplink to the physical function, and forward fourth data from the physical function to the virtual function.

In accordance with a 5th exemplary aspect of the present disclosure, which may be used in combination with any one or more of the preceding aspects (e.g., the 4th aspect), the hypervisor is further configured to forward the third data from the physical function to the virtual function by sending the data on the virtual channel.

In accordance with a 6th exemplary aspect of the present disclosure, which may be used in combination with any one or more of the preceding aspects (e.g., the 5th aspect), the hypervisor is further configured to receive the third data forwarded from the uplink on the physical channel of the physical function.

In accordance with a 7th exemplary aspect of the present disclosure, which may be used in combination with any one or more of the preceding aspects (e.g., the 1st aspect), the system further includes a network-interface controller, which includes the virtual function, the physical function, and the uplink, wherein the network-interface controller is configured to transmit, from the virtual function, the first data to the virtual channel of the physical function and transmit, from the physical channel of the physical function, the first data to the uplink, and transmit the second data, from the physical channel of the physical function, to the uplink.

In accordance with an 8th exemplary aspect of the present disclosure, which may be used in combination with any one or more of the preceding aspects (e.g., the 7th aspect), the network-interface controller is further configured to receive the third data forwarded from the uplink to the physical function, and forward the fourth data from the physical function to the virtual function.

In accordance with a 9th exemplary aspect of the present disclosure, which may be used in combination with any one or more of the preceding aspects (e.g., the 7th aspect), the system further includes a guest application configured to transmit packets to the network-interface controller.

In accordance with a 10th exemplary aspect of the present disclosure, which may be used in combination with any one or more of the preceding aspects (e.g., the 1st aspect), the hypervisor is further configured to filter the first data prior to forwarding the first data from the physical function.

Aspects of the subject matter described herein may be useful alone or in combination with one or more other aspects described herein. In an 11th exemplary aspect of the present disclosure, a method includes receiving first data originating at a virtual function and forwarded to a physical function forwarding the first data on a physical channel of the physical function, the physical function being configured to forward the first data to an uplink, and sending second data not originating at the virtual function on a virtual channel of the physical function, the physical function being configured to forward the second data to the virtual function.

In accordance with a 12th exemplary aspect of the present disclosure, which may be used in combination with any one or more of the preceding aspects (e.g., the 11th aspect), second data is sent on the physical channel of the physical function to the uplink.

In accordance with a 13th exemplary aspect of the present disclosure, which may be used in combination with any one or more of the preceding aspects (e.g., the 11th aspect), first data originating at the virtual function is received on the virtual channel.

In accordance with a 14th exemplary aspect of the present disclosure, which may be used in combination with any one or more of the preceding aspects (e.g., the 11th aspect), third data forwarded from the uplink to the physical function is received, and fourth data is forwarded from the physical function to virtual function.

In accordance with a 15th exemplary aspect of the present disclosure, which may be used in combination with any one or more of the preceding aspects (e.g., the 14th aspect), third data is forwarded the third data from the physical function to the virtual function by sending the data on the virtual channel.

In accordance with a 16th exemplary aspect of the present disclosure, which may be used in combination with any one or more of the preceding aspects (e.g., the 14th aspect), third data forwarded from the uplink on the physical channel of the physical function is received.

In accordance with a 17th exemplary aspect of the present disclosure, which may be used in combination with any one or more of the preceding aspects (e.g., the 11th aspect), a network-interface controller transmits, from the virtual function, the first data to the virtual channel of the physical function and transmit, from the physical channel of the physical function, the first data to the uplink, and transmits the second data, from the physical channel of the physical function, to the uplink.

In accordance with an 18th exemplary aspect of the present disclosure, which may be used in combination with any one or more of the preceding aspects (e.g., the 17th aspect), the network-interface controller receives third data forwarded from the uplink to the physical function, and forwards fourth data from the physical function to the virtual function.

In accordance with a 19th exemplary aspect of the present disclosure, which may be used in combination with any one or more of the preceding aspects (e.g., the 17th aspect), a guest application transmits packets to the network-interface controller.

In accordance with a 20th exemplary aspect of the present disclosure, which may be used in combination with any one or more of the preceding aspects (e.g., the 11th aspect), the first data is filtered prior to forwarding the first data from the physical function.

Aspects of the subject matter described herein may be useful alone or in combination with one or more other aspects described herein. In a 21st exemplary aspect of the present disclosure, a non-transitory machine-readable medium stores code, which when executed by a hypervisor, is configured to receive first data originating at a virtual function and forwarded to a physical function forwarding the first data on a physical channel of the physical function, the physical function being configured to forward the first data to an uplink, and send second data not originating at the virtual function on the virtual channel of the physical function, the physical function being configured to forward the second data to the virtual function.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention is claimed as follows:

1. A system comprising:
a physical network-interface controller (pNIC) that includes a physical function and a virtual function, the pNIC being configured to send and receive data packets via a physical link, wherein the physical function includes a virtual channel and a physical channel;
a virtual machine including a virtual network-interface controller (vNIC) that represents the pNIC in a virtual environment of the virtual machine;
a hypervisor managing the virtual machine, the hypervisor being configured to execute a physical function driver that provides a virtual bridge device and a virtual uplink device for the vNIC, the virtual uplink device being different from the physical link associated with the pNIC, wherein the virtual bridge device is configured to connect to the pNIC through the virtual channel of the physical function, and wherein the virtual uplink device is configured to connect to the pNIC through the physical channel of the physical function;
wherein the hypervisor is configured to:
receive first data from the physical function via the virtual bridge device, wherein the first data originates at the virtual machine;
filter the first data;
transmit the filtered first data to the virtual uplink device for forwarding to the physical function, the physical function being configured to forward the filtered first data to the physical link for transmission to an external destination;
receive second data from the physical function via the virtual uplink device, wherein the second data originates from a source other than the virtual machine and is received at the pNIC via the physical link;
filter the second data; and
transmit the filtered second data to the virtual bridge device for forwarding to the physical function, the physical function being configured to forward the filtered second data to the virtual machine.

2. The system of claim 1, wherein the hypervisor is configured to send the second data on the physical channel of the physical function to the virtual uplink device.

3. The system of claim 1, wherein the hypervisor is configured to receive the first data via the virtual channel.

4. The system of claim 1, wherein the hypervisor is configured to:
receive third data from the virtual uplink device; and
forward fourth data from the physical function to the virtual function.

5. The system of claim 4, wherein the hypervisor is configured to forward the third data from the physical function to the virtual function by sending the third data on the virtual channel.

6. The system of claim 1, wherein the vNIC is configured to:
transmit, from the virtual function, the first data to the virtual channel of the physical function;
transmit, from the physical channel of the physical function, the first data to the virtual uplink device; and
transmit the second data, from the physical channel of the physical function, to the virtual uplink device.

7. The system of claim 6, wherein the vNIC is further configured to:
receive third data forwarded from the virtual uplink device to the physical function; and
forward fourth data from the physical function to the virtual function.

8. The system of claim 6, further comprising a guest application configured to transmit packets to the vNIC.

9. A method comprising:
managing, by a hypervisor executing on a processor, a virtual machine that includes a virtual network-interface controller (vNIC), the vNIC representing a physical network-interface controller (pNIC) in a virtual environment of the virtual machine, wherein the pNIC includes a physical function and a virtual function, the pNIC being configured to send and receive data packets via a physical link, wherein the physical function includes a virtual channel and a physical channel, the hypervisor being separate from the virtual machine;
executing, by the hypervisor, a physical function driver that provides a virtual bridge device and a virtual uplink device for the vNIC, the virtual uplink device being different from the physical link associated with the pNIC, wherein the virtual bridge device is connected to the pNIC through the virtual channel of the physical function, and wherein the virtual uplink device connected to the pNIC through the physical channel of the physical function;
wherein the hypervisor:
receives first data from the physical function via the virtual bridge device, wherein the first data originates at the virtual machine;
filters the first data;
transmits the filtered first data to the virtual uplink device for forwarding to the physical function, wherein the physical function forwards the filtered first data to the physical link for transmission to an external destination;
receives second data from the physical function via the virtual uplink device, wherein the second data originates from a source other than the virtual machine and is received at the pNIC via the physical link;
filters the second data; and
transmits the filtered second data to the virtual bridge device for forwarding to the physical function, wherein the physical function forwards the filtered second data to the virtual machine.

10. The method of claim 9, wherein the second data is sent on the physical channel of the physical function to the virtual uplink device.

11. The method of claim 9, wherein the hypervisor receives the first data via the virtual channel.

12. The method of claim 9, wherein third data forwarded from the virtual uplink device to the physical function is received; and
fourth data is forwarded from the physical function to the virtual function.

13. The method of claim 12, wherein the third data is forwarded from the physical function to the virtual function by sending the third data on the virtual channel.

14. The method of claim 9, wherein the vNIC:
transmits, from the virtual function, the first data to the virtual channel of the physical function;
transmits, from the physical channel of the physical function, the first data to the virtual uplink device; and
transmits the second data, from the physical channel of the physical function, to the virtual uplink device.

15. The method of claim 14, wherein the vNIC:
receives third data forwarded from the virtual uplink device to the physical function; and
forwards fourth data from the physical function to the virtual function.

16. The method of claim 14, wherein a guest application transmits packets to the vNIC.

17. A non-transitory machine-readable medium storing code for a hypervisor that is executable by a processor to:
manage a virtual machine that is separate from the hypervisor, the virtual machine including a virtual network-interface controller (vNIC) representing a physical network-interface controller (pNIC) in a virtual environment of the virtual machine, the pNIC including a physical function and a virtual function, the pNIC being configured to send and receive data packets via a physical link, the physical function including a virtual channel and a physical channel;
execute a physical function driver that provides a virtual bridge device and a virtual uplink device for the vNIC, the virtual uplink device being different from the physical link associated with the pNIC, wherein the virtual bridge device is connected to the pNIC through the virtual channel of the physical function, and wherein the virtual uplink device connected to the pNIC through the physical channel of the physical function;
receive first data from the physical function via the virtual bridge device, wherein the first data originates at the virtual machine;
filter the first data;
transmit the filtered first data to the virtual uplink device for forwarding to the physical function, wherein the physical function forwards the filtered first data to the physical link for transmission to an external destination;
receive second data from the physical function via the virtual uplink device, wherein the second data originates from a source other than the virtual machine and is received at the pNIC via the physical link;
filter the second data; and
transmit the filtered second data to the virtual bridge device for forwarding to the physical function, wherein the physical function forwards the filtered second data to the virtual machine.

* * * * *